(No Model.)
M. DILLENBURG.
PIPE COUPLING.
No. 455,178. Patented June 30, 1891.
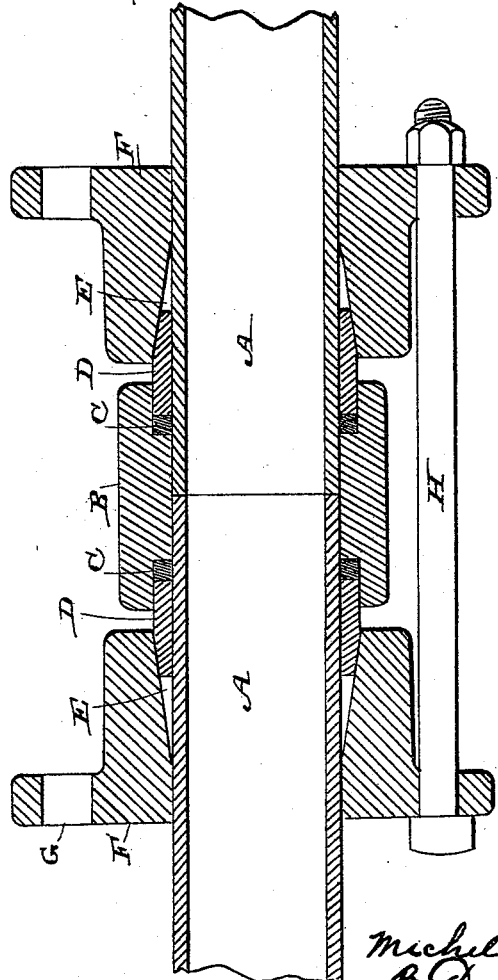
Witnesses,
Inventor,
Michel Dillenburg
By Dewey & Co.
attys

United States Patent Office.

MICHEL DILLENBURG, OF SAN FRANCISCO, CALIFORNIA.

PIPE-COUPLING.

SPECIFICATION forming part of Letters Patent No. 455,178, dated June 30, 1891.

Application filed April 13, 1891. Serial No. 388,772. (No model.)

*To all whom it may concern:*

Be it known that I, MICHEL DILLENBURG, a citizen of the United States, residing in the city and county of San Francisco, State of California, have invented an Improvement in Pipe-Couplings; and I hereby declare the following to be a full, clear, and exact description of the same.

My invention relates to an improvement in pipe-couplings; and it consists in certain details of construction, which will be more fully explained by reference to the accompanying drawings, in which—

Figure 1 is a longitudinal section of my coupling. Fig. 2 is a transverse section of the same.

In a former patent issued to me August 4, 1885, I have shown a coupling in which the two meeting ends of the pipes are inclosed by a sleeve, the end of which enters a recess or seat which is made in the head surrounding the pipe. This recess is made somewhat larger than the pipe and straight for a short distance, after which it tapers, passing entirely through the head, and a split ring or sleeve is fitted into this taper portion, and is compressed upon the pipe by drawing the head F up by means of bolts passing through it and another similar head on the other part of the pipe.

In my present invention the coupling heads or sleeves have tapering openings of larger diameter than the pipe made only a portion of the way through them from their adjacent faces, and the split clamping-rings made correspondingly conical at one end fit into these tapering spaces, while the opposite ends abut against packing-rings which are fitted within a sleeve intermediate between the coupling heads or sleeves.

A A are two sections of pipe which are to be coupled together, the ends abutting, as shown. These abutting ends are surrounded by a collar B, which fits over the ends of the pipe. At each end this collar is countersunk, so as to make openings of large diameter, which extend in a short way from the end toward the center, and within these openings are fitted the gaskets or packing-rings C, by which a tight joint is made.

D D are rings which fit around the sections A A of the pipe, and are split upon one side, so that they may be closely compressed and clamped upon the pipe by exterior pressure. These rings are of such diameter that their adjacent ends enter the enlarged or counter-sunk openings in the collar B and abut against the elastic packing-rings C, as shown. The opposite ends of the rings B are turned tapering or conical, and they fit into correspondingly-tapering openings E, which are bored into the inner ends of the coupling heads or flanges F. These tapering openings extend to or a little beyond the transverse centers of the heads F, and from that point to the outer faces the diameter of the openings in the heads is just sufficient to allow them to slip over the pipes A.

Holes G are made through the flanges of the heads F, and bolts H pass through these holes, and by means of nuts upon these bolts the two heads F are drawn toward each other and fit over the tapering ends of the rings D. The inner ends of these rings are forced into the countersunk openings in the ends of the collar B, so as to press upon the elastic packing C, and at the same time by reason of the tapering outer ends of the rings and the corresponding opening in the heads into which these tapering ends are fitted they are strongly compressed upon the pipes A, so as to clamp them firmly in place and prevent their being drawn apart, while the packing-ring C insures a perfectly-tight joint. By this construction I am enabled to make the heads of smaller diameter and less bulky, and when the bolts H are removed, if it is desired to uncouple the pipes, it is easier to loosen them and separate the pipes.

Having thus described my invention, what I claim as new, and desire to secure by Letters Patent, is—

An improved pipe-coupling consisting of the combination of split sleeves surrounding the pipe, having their outer ends made conical or tapering on their exterior surface only, a collar between the sleeves having its opposite ends provided with countersunk channels for the reception of the inner ends of the sleeves, packing-rings in said channels, the coupling-heads adapted to be fitted on the outer ends of the sleeves, having flanges provided with openings G and having a central opening for the pipe, said central opening tapering outwardly from a point near the center of heads to the inner ends thereof to fit the conical ends of the sleeves, and bolts passing through the openings G and provided with nuts for drawing the heads together, substantially as herein described.

In witness whereof I have hereunto set my hand.

MICHEL DILLENBURG.

Witnesses:
S. H. NOURSE,
J. A. BAYLESS.